United States Patent [19]

Sampsell

[11] Patent Number: 5,517,347
[45] Date of Patent: May 14, 1996

[54] DIRECT VIEW DEFORMABLE MIRROR DEVICE

[75] Inventor: Jeffrey B. Sampsell, Plano, Tex.

[73] Assignee: Texas Instruments Incorporated, Dallas, Tex.

[21] Appl. No.: 159,963

[22] Filed: Dec. 1, 1993

[51] Int. Cl.⁶ .............. G02B 5/08; G02B 6/04; G02B 6/24; G02B 26/08
[52] U.S. Cl. .............. 359/224; 359/225; 359/291; 359/318; 359/855; 359/891; 359/900; 385/18; 385/116; 385/119; 385/120
[58] Field of Search .............. 359/224, 225, 359/291, 318, 853, 855, 865, 900, 891; 385/17, 33, 115, 116, 119, 120, 18

[56] References Cited

U.S. PATENT DOCUMENTS

| | | | |
|---|---|---|---|
| 3,875,627 | 4/1975 | Hasegawa et al. | 385/120 |
| 4,569,571 | 2/1986 | Reidinger | 385/120 |
| 4,601,537 | 7/1986 | Saccocio | 385/120 |
| 4,859,012 | 8/1989 | Cohn | 385/33 |
| 5,037,173 | 8/1991 | Sampsell et al. | 385/17 |
| 5,127,078 | 6/1992 | Terry et al. | 385/115 |
| 5,129,028 | 7/1992 | Soltan | 385/115 |
| 5,240,818 | 8/1993 | Mignardi et al. | 359/855 |

FOREIGN PATENT DOCUMENTS 2026196  1/1980  United Kingdom .............. 385/120

*Primary Examiner*—Ricky D. Shafer
*Attorney, Agent, or Firm*—Julie L. Reed; Richard L. Donaldson; Rene E. Grossman

[57] ABSTRACT

A faceplate (10a) for directly viewing an image generated by a digital micromirror device (10b), which generates images by tilting tiny mirror elements (11) to on or off positions. The faceplate (10a) has a number of optical fibers (12) parallel to each other and closely spaced together. The ends of the optical fibers (12) are the top and bottom surfaces of the faceplate (10a). Both ends of each fiber (12) is sliced at an angle determined by the on position of the mirror elements (11). This permits light to travel down the fibers (12) and be reflected back to the viewer by only those mirror elements (11) that are on.

12 Claims, 2 Drawing Sheets

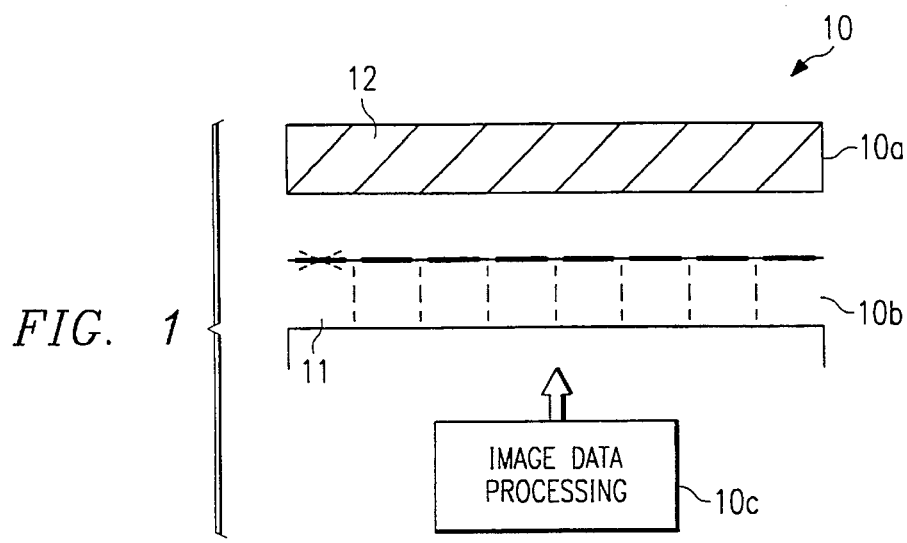
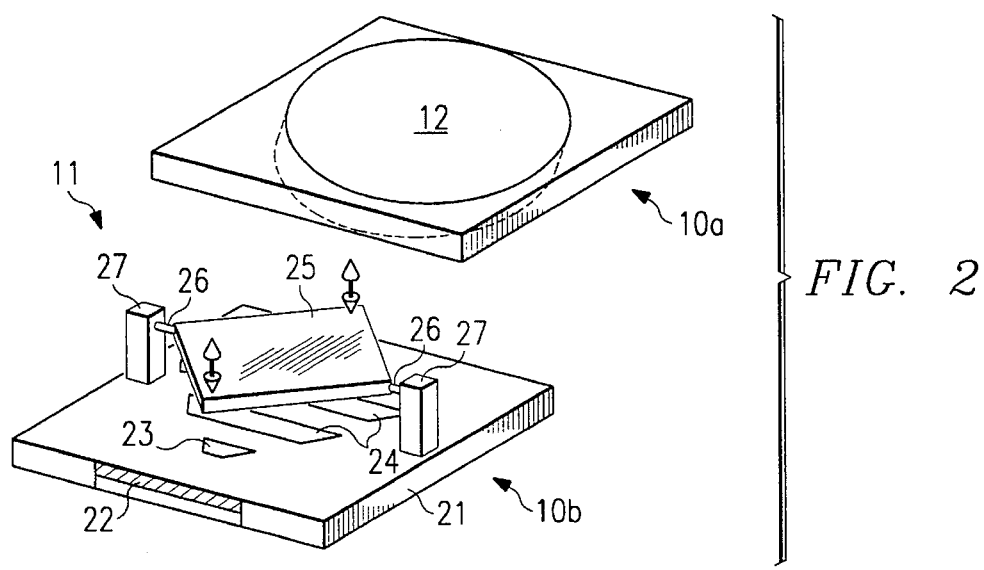
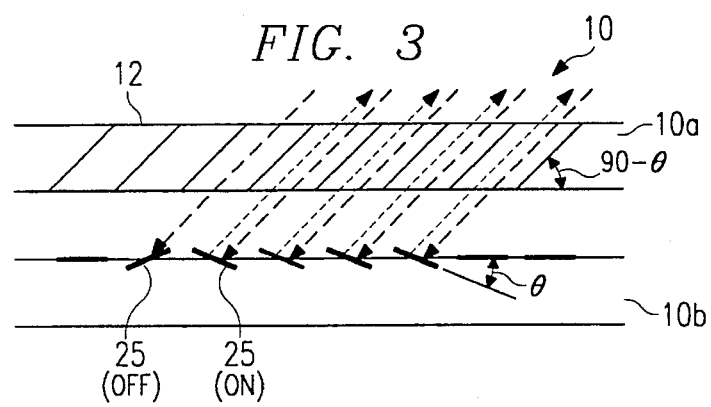

DIRECT VIEW DEFORMABLE MIRROR DEVICE

TECHNICAL FIELD OF THE INVENTION

This invention relates to image display systems, and more particularly to a deformable mirror device that provides a direct view image.

BACKGROUND OF THE INVENTION

Real-time display systems based on spatial light modulators (SLMs) are increasingly being used as an alternative to display systems using cathode ray tubes (CRTs). SLM systems provide high resolution displays without the bulk and power consumption of a CRT system.

Digital micromirror devices (DMDs) are a type of SLM, and may be used in display applications. A DMD has an array of micro-mechanical pixel elements, each having a mirror and a memory cell. Each pixel element is individually addressable by electronic data. Depending on the state of its addressing signal, each mirror is tilted so that it either does or does not reflect light to the image plane, i.e., so that it is on or off. The proportion of time during each video frame that a mirror is in an on state determines shades of gray—from black for zero on time to white for 100 percent on time.

Existing DMD display systems are projection systems. Light from the on mirrors passes through a projection lens and creates images on a large screen. Light from the off mirrors is reflected away from the projection lens and trapped. Color may be added in two ways, by a color wheel or by a three-DMD configuration.

DMDs may be fabricated using semiconductor fabrication techniques. To fabricate a DMD, standard CMOS processing steps are completed for a static RAM, which comprises the memory cells, and for address electrodes. Then, a "roof" of tilting mirrors is fabricated over the memory and address circuit. The height of this superstructure is enough to allow the mirrors to tilt plus and minus 10 degrees or so about a torsion axis.

The display optics for viewing the image generated by the DMD is easily implemented for projection viewing. For example, the DMD may be coupled with dark-field projection optics. Here, a bright light source is directed to the chip at an angle to its surface. Mirrors tilted to an on position reflect the incoming light through a projection lens and onto a screen. Mirrors tilted to an off position reflect the incoming light so as to miss the projection lens.

SUMMARY OF THE INVENTION

A first aspect of the invention is a faceplate for a direct view display system, which provides images reflected from a digital micromirror device (DMD) having mirror elements that are tilted to on or off positions. The faceplate has a number of optical fibers, attached together such that they are parallel and closely spaced. Upper and lower end surfaces of the fibers are at the upper and lower surfaces, respectively, of the faceplate. These end surfaces are angled with respect to the axis of the optical fibers, at an angle that is determined by the on tilt angle of the mirror elements. The faceplate is spaced above the surface of the DMD and permits ambient light to travel down the fibers and be reflected back up by the on mirror elements.

A technical advantage of the invention is that it permits a DMD-generated image to be directly viewed without a bulky optical system. The direct view system is inexpensive and compact. It is suitable for head or wrist mounted, or other small displays.

BRIEF DESCRIPTION OF THE DRAWINGS

FIG. 1 is a cross sectional view of a direct view display system, which uses a DMD to generate an image from image data.

FIG. 2 is a perspective view of a single mirror element and an associated optical fiber of a direct view DMD.

FIG. 3 is a cross sectional view of the display system of FIG. 1, with the mirror elements in an on position to receive and reflect incident light.

DETAILED DESCRIPTION OF THE INVENTION

Figure 4:
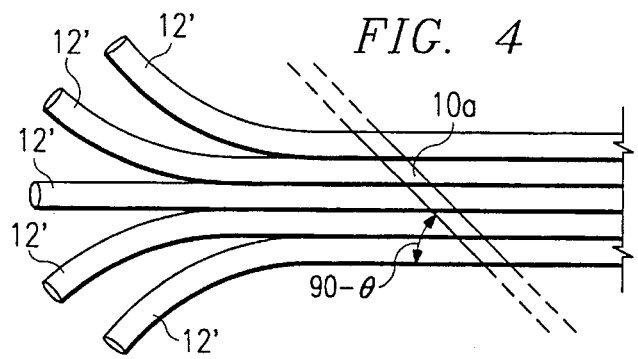
FIG. 4 illustrates how the faceplate for the display system may be made from a bundle of optical fibers.

FIG. 1 is a cross sectional view of a direct view display system 10, which uses a digital micromirror device (DMD) 10b to generate an image from data provided by image data processing unit 10c. A faceplate 10a directs ambient light to the surface of the DMD and directs the image back to the viewer.

DMD 10b is an array of mirror elements 11, which tilt in accordance with the state of data received from image data processing unit 10c. Each mirror element 11 has three states. Its mirror may tilt in either of two directions, as indicated by the dotted lines, or it may have a flat position, in which the mirrors are parked when the DMD is not in use.

Faceplate 10a is attached to DMD 10b and spaced from the top surface of DMD 10b. The spacing between the top surface of DMD 10b and the bottom surface of faceplate 10a is enough to permit the tilting action of the mirror elements 11 of DMD 10b.

Faceplate 10a is a set of optical fibers 12, which are parallel to each other and positioned so that their end surfaces are at the top and lower surface of faceplate 10a, respectively. These end surfaces are angled with respect to the axis of the fibers 12, each angle being the same. As explained below in connection with FIG. 3, this angle is determined by the on tilt position of each mirror element 11.

Fibers 12 are attached to each other, which may be accomplished by any one of a number of means. For example, fibers 12 may be attached by means of adhesive or by means of a template having vias through which fibers are inserted. A common means for manufacturing a bundle of optical fibers is to adhere them to each other by means of a glass frit material that serves as a type of adhesive.

In the example of this description, fibers 12 are attached so that they are immediately adjacent to each other. In other embodiments, fibers 12 could be slightly spaced apart, but in general, fibers 12 are densely packed. Typically, as shown in FIG. 1, the length of optical fibers 12 is short relative to the area of faceplate 10a.

In FIG. 1, there a one-to-one correspondence of mirror elements 11 to optical fibers 12. However, in different embodiments, more than one pixel element 11 may share a fiber 12, or a pixel element 11 may have more than one fiber 12. As explained below in connection with FIGS. 5–7, the number of fibers 12 relative to the number of mirror elements 11 is related to the resolution of display 10.

Image data processing system 10c receives analog or digital video data to be displayed on DMD 10b. If the data is analog, processing system 10c converts the data to digital form. It performs other operations such as degamma correction, color conversion, and progressive scanning, and other image processing tasks. These tasks may be implemented with logic circuits, with a processor executing storing instructions, or with some combination or hybrid of both types of processors. Processing system 10c includes a display memory for buffering frames of data in a "bit-plane format" in which each frame of pixel values are delivered to the DMD 10b one bit per pixel at a time. Further details about an exemplary image data processing system 10c for use with a DMD 10b, are set out in U.S. Pat. No. 5,079,544, entitled "Standard Independent Digitized Video System", U.S. Ser. No. 08/147,249 (Atty Dkt No TI-17855), entitled "Digital Television System", U.S. Ser. No. 07/678,761, entitled "DMD Architecture and Timing for Use in a Pulse-Width Modulated Display System"; U.S. Ser. No. 07/809,816, entitled "White Light Enhanced Color Field Sequential Projection"; and U.S. Pat. No. 5,452,014 (Atty Dkt No. TI-17671), entitled "DMD Display System". Each of these patents and patent applications are assigned to Texas Instruments Incorporated, and each is incorporated by reference herein.

FIG. 2 is a perspective view of a single mirror element 11 having an associated optical fiber 12. Whereas FIG. 1 is a side view showing the tilt angles of each mirror element 11, FIG. 2 is a front view. In FIG. 2, mirror element 11 is shown in its flat position but it could tilt up or down as indicated by the arrows.

A typical mirror element 11 is square, with 16 micrometers on a side. Mirror elements 11 may be spaced as closely as 1 micrometer apart. A typical DMD 10b might have thousands of mirror elements 11. Thus, for example, where DMD 10a is a square array of 1000×1000 mirror elements 11, the dimensions of faceplate 10a would be in the order of 17,000×17,000 micrometers.

The array of mirror elements 11 is fabricated on a silicon substrate 21 using semiconductor fabrication techniques. Each mirror elements 11 is in electrical communication with a memory cell 22 of a static RAM. Depending on the particular addressing scheme to be implemented, each mirror element 11 might have its own memory cell 22, or several mirror elements 11 might share a memory cell 22. Directly over memory cell 22 is an addressing layer, having two landing electrodes 23 and two address electrodes 24. Only one landing electrode is visible in FIG. 2; the two electrodes 23 are under opposing corners of the mirror 25. Mirror 25 is above electrodes 23 and 24, supported by hinges 26 attached support posts 27.

To fabricate a DMD, standard processing steps are used to create the layer of static RAMcells 22 on substrate 21. Typically, the RAM cells 22 are made in accordance with CMOS processing. The electrodes 23 and 24 may be fabricated with conventional metal lithography. At the next processing phase, the wafer is coated with a polymer spacer layer. Vias are etched through the polymer layer to contact sites, on which are fabricated the support posts 27. Next, a thin aluminum layer (for hinges 26) and a thicker aluminum mirror layer (for mirrors 25) are deposited, patterned, and etched. A plasma etch removes what is left of the polymer layer, leaving the mirrors 25 suspended above the electrodes 23 and 24 by the hinges 26 attached to the support posts 27. In operation, electrostatic forces, based on the data in memory cell 22, as applied to address electrodes 23 and 24, cause mirror 25 to tilt. While tilted, the surface of mirror 25 is flat and the hinges 26 twist in torsion.

Further details about the structure, operation, and fabrication of an exemplary DMD are set out in U.S. Pat. No 4,956,619, entitled "Spatial Light Modulator", and incorporated herein by reference.

FIG. 3 illustrates how the optical fibers 12 of faceplate 10a are slanted at an angle that is determined by the on tilt angle of mirror elements 11. If the tilt angle is θ, the angle at which fibers 12 are slanted is 90-θ degrees. This angle is referred to herein as the "bias angle" of the fibers 12. The bias angle permits light to travel down the fibers 12 and be reflected by the mirrors 25 that are on. Mirrors that are tilted to an off position will reflect light out of the acceptance angle of the fibers 12. The light reflected by the off mirror elements 11 is absorbed at the back of faceplate 10a. The viewer will see the on mirror elements 11 as light and the off mirror elements 11 as dark.

FIG. 4 illustrates how faceplate 10a may be made by slicing a bundle of optical fibers 12'. FIG. 4 is greatly simplified—where there is a one-to-one correspondence between fibers 12 and mirror elements 11, faceplate 10a would be made from as many fibers 12' as there are mirror elements 11, and the diameter of each fiber 12' would be approximately same as the side dimension of each mirror element 11. However, as explained below, the diameter of fibers 12 is a matter of desired resolution.

Many optical fibers 12' are drawn into a bundle and a portion of the bundle is sliced off. For mirror elements 11 having a 10 degree on tilt position, the bundle is sliced 80 degrees (90–10 degrees) off-axis. For mirror elements 11 having other degrees of on tilt positions, fibers 12' would be sliced at a corresponding angle.

Figure 5:
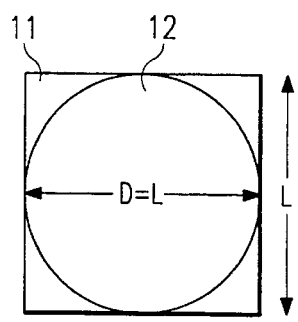
FIGS. 5–7 illustrate relative sizes of a mirror's surface and the diameter of the optical fibers of the faceplate.
Figure 6:
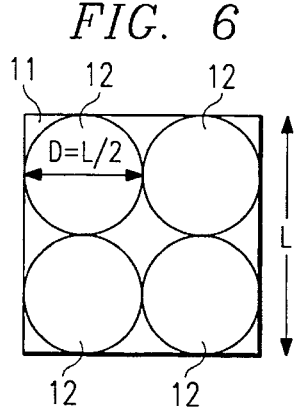
Figure 7:
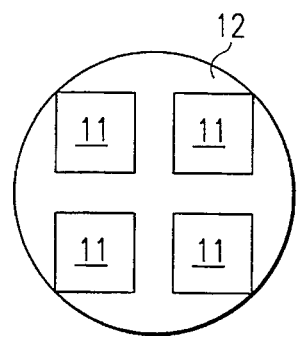

FIGS. 5–7 illustrate how the relationship between the end surface area of fibers 12 and the surface area of mirrors 11 affects the resolution of display 10. FIGS. 5–7 are top plan views, representing the view down fibers 12 onto the surfaces of mirror elements 11. Each fiber 12 has an "acceptance area", determined by its diameter, D In FIG. 5, as in FIGS. 1–4, the acceptance area of fiber 12 "matches" the surface area of mirror element 11, in the sense that the diameter of fiber 12, D, is approximately the same as the side dimension, L, of mirror element 11. For this embodiment of faceplate 10a, the best resolution is achieved if each fiber 12 is centered over its corresponding mirror element 11, as illustrated. Various techniques can be used when attaching faceplate 10a over DMD 10b to ensure proper alignment.

In FIG. 6, each mirror element 11 has four fibers 12. This embodiment reduces the need to ensure alignment of faceplate 10a to DMD 10b. For example, if the four fibers 12 were shifted to one direction or another, with respect to the surface of mirror element 11, mirror element 11 would continue to receive and reflect all light from two fibers 12. The greater the number of fibers per mirror element 11, the less critical the alignment of fibers 12 to mirror elements 11.

In FIG. 7, the acceptance area of each fiber 12 is greater than the surface area of mirror element 11. In this type of embodiment, display 10 operates with a corresponding decrease in resolution. For example, if a single fiber 12 were placed above a set of four mirror elements 11, the on and off positions of those four mirror elements 11 would determine the portion of the image reflected back to the viewer. However, an advantage of this embodiment is that the on and off times of each mirror elements 11 of the set of four mirror elements 11 can be controlled to provide a greyscale value under their fiber 12.

Figure 8:
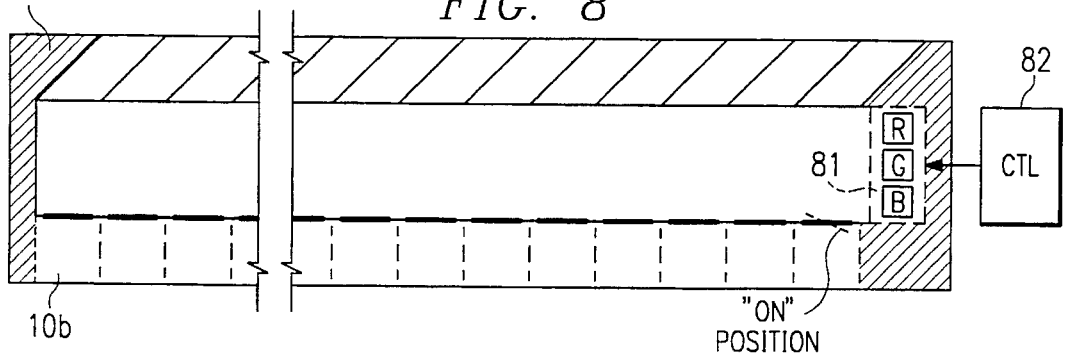
FIG. 8 illustrates a direct view display system with an internal light source.

FIG. 8 illustrates how a light source 81 may be placed at one side of the space between faceplate 10a and DMD 10b.

This permits display 10 to generate images when there is no ambient light to be carried to the surface of DMD 10b by fibers 12. A control unit 82 permits a user to switch light source 81 on or off and provides any power that might be required. As indicated, light source 81 is positioned to a side of DMD 10b that corresponds to the direction of the "on" tilt position. If light source 81 directs light to the bottom surface of faceplate 10a, the end surfaces of fibers 12 will disperse the light toward the reflective surface of DMD 10b. Light source 81 may be one or more light emitting diodes (LEDs) or some other appropriate source of light.

Light source 81 may be a single white light source for black and white images. For greyscale images, processing unit 10c can implement pulse width modulation techniques, so as to control the length of time during each frame period that a mirror element 11 is on or off.

Or, as shown in FIG. 8, for color images, light source 81 may be a set of three light sources, red, green, and blue. Each mirror element 11 receives data for each color sequentially. The different color sources are turned on and off, sequentially, in synchronization with the data being receiving by the mirror elements.

Figure 9:
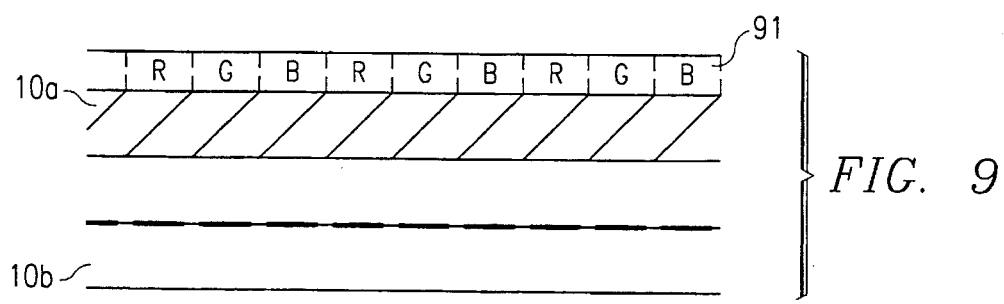
FIG. 9 illustrates a faceplate having a transparent color filter.

FIG. 9 illustrates an alternative embodiment of faceplate 10a, for providing color images. In this embodiment, faceplate 10a has a transparent color filter 91 covering the upper end surfaces of fibers 12. Color filter 91 has alternately strips of red, green, and blue material. The incident light is filtered by these strips as it passes through color filter 91, thereby producing color images. Alternatively, color filter 91 could cover the bottom end surfaces of fibers 12. Also, instead of strips of differently colored material, filter 91 could be made from triads of red, green, and blue squares or other polygon shaped areas, of material. Ideally, the size of these stripes or shapes is sufficiently small to provide one color for each mirror element 11, but other relative sizes are possible.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of directly viewing an image generated by a digital micromirror device (DMD) having mirror elements that tilt to an on tilt angle, comprising the steps of:

forming both ends of a number of optical fibers at a bias angle that is determined by said on tilt angle;

grouping said optical fibers into a faceplate having a planar bottom surface and a planar top surface defined by said ends;

placing said bottom surface parallel to and near the reflective surface of said DMD; and viewing an image generated by said DMD at said top surface.

2. The method of claim 1, further comprising the step of placing a transparent color filter of differently colored sections of material directly above or directly below said faceplate.

3. The method of claim 1, further comprising the step of aligning said optical fibers with said mirror elements.

4. The method of claim 1, wherein said grouping step is accomplished by grouping a number of fibers that is approximately the same as the number of mirror elements.

5. The method of claim 1, wherein said grouping step is accomplished by grouping a number of fibers that exceeds the number of mirror elements.

6. The method of claim 1, wherein said grouping step is accomplished by grouping a number of fibers that is less than the number of mirror elements.

7. The method of claim 1, further comprising the step of placing a light source between said faceplate and said DMD at an edge of said faceplate in the direction of said bias angle.

8. The method of claim 7 wherein said light source is a set of differently colored light sources, and further comprising the step of sequentially activating said light sources in accordance with data being delivered to said DMD.

9. A direct view display system, comprising:

a digital micromirror device for generating images by tilting an array of mirrors to on or off tilt angles;

an image data processing system for generating image data representing said image and for delivering said data to said digital micromirror device; and a faceplate having a number of optical fibers, attached together such that they are parallel to each other and closely spaced, wherein said fibers are of equal length so as to provide a planar shape of said faceplate, and wherein the end surfaces of said fibers comprise an upper and a lower surface of said faceplate, and wherein said optical fibers have a bias angle with respect to the plane of said faceplate that is determined by said tilt angle of said mirror elements.

10. The direct view display system of claim 9, wherein said faceplate has a bias angle of approximately ninety degrees minus the value of said tilt angle.

11. The direct view display system of claim 9, further comprising a light source between said faceplate and said DMD at a side of said DMD corresponding to the direction of said bias angle.

12. The direct view display system of claim 9, further comprising a transparent color filter at the upper or lower surface of said faceplate, said color filter having sections of differently colored material.

* * * * *